United States Patent
Park et al.

(10) Patent No.: US 11,009,588 B2
(45) Date of Patent: May 18, 2021

(54) SYSTEM AND METHOD FOR VEHICLE RADAR INSPECTION

(71) Applicants: HYUNDAI MOTOR COMPANY, Seoul (KR); KIA MOTORS CORPORATION, Seoul (KR)

(72) Inventors: Jihoon Park, Suwon-si (KR); Haseung Seong, Daejeon (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 0 days.

(21) Appl. No.: 17/005,756

(22) Filed: Aug. 28, 2020

(65) Prior Publication Data

US 2020/0393539 A1 Dec. 17, 2020

Related U.S. Application Data

(62) Division of application No. 15/824,795, filed on Nov. 28, 2017, now Pat. No. 10,794,995.

(30) Foreign Application Priority Data

Aug. 17, 2017 (KR) .................. 10-2017-0104240

(51) Int. Cl.
| | |
|---|---|
| G01S 7/40 | (2006.01) |
| G01S 13/931 | (2020.01) |
| G01S 17/02 | (2020.01) |
| G01S 13/89 | (2006.01) |
| G03B 42/00 | (2021.01) |
| G03B 35/02 | (2021.01) |

(52) U.S. Cl.
CPC .......... *G01S 7/4021* (2013.01); *G01S 7/4026* (2013.01); *G01S 13/89* (2013.01); *G01S 13/931* (2013.01); *G01S 17/02* (2013.01); *G01S 2007/403* (2013.01); *G01S 2013/93271* (2020.01); *G03B 35/02* (2013.01); *G03B 42/00* (2013.01)

(58) Field of Classification Search
CPC ...... G01S 7/4021; G01S 7/4026; G01S 17/02; G01S 13/89; G01S 13/931; G01S 2007/403; G01S 2013/93271; G03B 42/00; G03B 35/02
USPC ........................................................ 342/174
See application file for complete search history.

(56) References Cited

U.S. PATENT DOCUMENTS

| | | | |
|---|---|---|---|
| 2013/0239425 A1* | 9/2013 | Ham ............... | B60R 19/483 33/533 |
| 2014/0176414 A1* | 6/2014 | Enami ............. | G09G 3/3688 345/107 |

* cited by examiner

*Primary Examiner* — Bo Fan
(74) *Attorney, Agent, or Firm* — Brinks Gilson & Lione (57) ABSTRACT

The present disclosure provides a system and method for a vehicle radar inspection. A system for inspecting an assembled state of a radar sensor mounted in a vehicle may include a center portion configured to align the vehicle to a reference inspection position; a mobile terminal configured to connect with an external source of communication; a scan portion configured to photograph the radar sensor at a plurality of scan positions using a terahertz wave; and a server configured to match a plurality of scan images photographed by the scan portion, to detect a three-dimensional coordinate of the radar sensor, to transmit a sensor correction value through the mobile terminal, wherein the sensor correction value is determined based on an assembly tolerance that compares with a design plan of the vehicle, and to correct a sensor angle value of the radar sensor.

6 Claims, 6 Drawing Sheets

SYSTEM AND METHOD FOR VEHICLE RADAR INSPECTION

CROSS-REFERENCE TO RELATED APPLICATION

This application is a divisional application of U.S. patent application Ser. No. 15/824,795, filed on Nov. 28, 2017, which claims priority to and the benefit of Korean Patent Application No. 10-2017-0104240, filed on Aug. 17, 2017. The entirety of all of related applications are hereby incorporated by reference.

FIELD

The present disclosure relates to a system and method for a vehicle radar inspection, and more particularly, to a system and method for vehicle radar inspection inspecting a mounted state of radar of a vehicle.

BACKGROUND

The statements in this section merely provide background information related to the present disclosure and may not constitute prior art.

In general, a vehicle is mounted with radar monitoring a front driving situation of the vehicle to secure driving security of a driver.

The radar is mounted as an essential component for implementing advanced driver assistance systems (ADAS) such as a collision warning system, an automatic emergency brake (AEB) system, a smart cruise control (SCC) system, a lane departure warning system (LDWS), and the like of the vehicle.

Further, owing to many researches for an autonomous vehicle conducted recently, there may be a growing interest using the radar.

Figure 1:
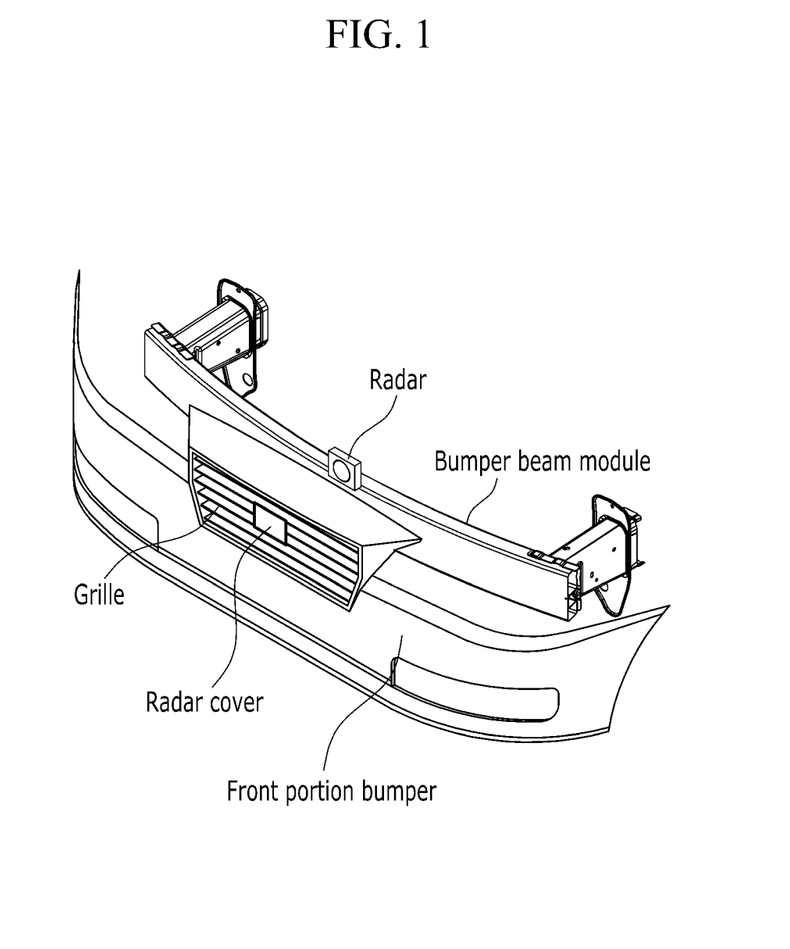
FIG. 1 illustrates a front portion of a vehicle to which radar is generally mounted.

FIG. 1 illustrates a front portion of a vehicle in which radar is generally mounted.

Referring to FIG. 1, a conventional radar is mounted in a bumper of the front portion of the vehicle, and transmits and receives a radar signal through a radar cover formed on the grille. Here, the grille is a passage through which air for cooling an engine is introduced during the driving and is often considered to be a major factor influencing an appearance design of the vehicle.

Therefore, in order to improve the appearance of the vehicle, a small size of the radar cover may be preferred in terms of design.

However, when mounting the radar in a beam module of a front bumper or mounting the radar cover, assembly error may occur. Particularly, a corner portion of the radar cover is rather recognized due to the small size of the radar cover.

Further, when an error occurs in mounting the radar, precision of a sensor may be reduced, quality of ADAS may be deteriorated, or the ADAS may not be used at all.

Therefore, a method capable of more closely inspecting a mounted state and performance of the radar before a delivery of the vehicle may be desired.

The above information disclosed in this section is only for enhancement of understanding of the background of the disclosure and therefore it may contain information that does not form the prior art that is already known in this country to a person of ordinary skill in the art.

SUMMARY

The present disclosure provides a system and method for a vehicle radar inspection. The present disclosure improves a recognition error of a radar sensor as well as a precision quality by correcting assembly tolerance of the radar sensor through a matching of scan images photographed at a plurality of scan positions utilizing a terahertz wave scanner and correcting an angle of a radar signal utilizing a correction target.

One form of the present disclosure provides a system for a vehicle radar inspection inspecting an assembled state of a radar sensor mounted in a vehicle, including a center portion configured to align the vehicle to a reference inspection position of the radar sensor; a mobile terminal configured to connect with an external source of communication, wherein the mobile terminal is connected to a communication line within the vehicle; a scan portion configured to photograph the radar sensor at a plurality of scan positions using a terahertz wave; and a server configured to match a plurality of scan images photographed by the scan portions, detect a three-dimensional coordinate of the radar sensor, transmit a sensor correction value through the mobile terminal, wherein the sensor correction value is determined based on an assembly tolerance that compares with a design plan of the vehicle; and correct a sensor angle value of the radar sensor.

The center portion may be configured to detect a position of the vehicle through an upper vision sensor and align the vehicle to the reference inspection position by the driving roller, when tires of the vehicle are placed on a driving roller.

The mobile terminal may include mobile on-board diagnostics (OBD), wherein the mobile terminal is configured to receive the sensor correction value from the server through an antenna to transmit the sensor correction value to the radar sensor, and transmit the sensor angle value of the radar sensor to the server.

The scan portion may include a robot configured to control multiple positions; a scanner configured to transmit the plurality of scan images that are photographed through the terahertz wave at the plurality of scan positions to the server, wherein the scanner is mounted on a front part of the robot; and an oscillator configured to generate the terahertz wave and to supply the terahertz wave to the scanner.

The scanner may be configured to acquire a first scan image by moving to a first scan position that is predetermined based on a position of the radar sensor and to acquire a second scan image by moving to a second scan position in a horizontal direction.

The system may further include a correction target configured to reflect a radar signal, wherein the correction target is disposed on a front of the vehicle and the vehicle is placed on the reference inspection position.

The server may include a communicating unit configured to communicate with the radar sensor through the mobile terminal; an interface unit configured to connect communication with the center portion and the scan portion; a position recognizing unit configured to generate a stereoscopic image by matching the first scan image and the second scan image and recognize a three-dimensional coordinate of the stereoscopic image; and a control unit configured to compare the three-dimensional coordinate with a position value of the design plan of the vehicle and determine that the assembly tolerance occurs when the three-dimensional coordinate and the position value of the design plan of the vehicle are not matched.

The three-dimensional coordinate may be recognized by extracting at least three feature points on a stereoscopic image of a metal material through which the terahertz wave does not penetrate.

The control unit may be configured to generate a sensor correction value based on information reflected by the correction target by operating the radar sensor through the mobile terminal.

The control unit may determine that a correction of the radar sensor is completed when the mobile terminal receives the sensor angle value of the radar sensor after transmitting the sensor correction value.

The radar sensor may include a control module that is configured to adjust a value of a sensor angle at which the radar signal is transmitted and adjust the sensor angle based on the sensor correction value received from the server.

The radar sensor may be configured to adjust the value of the sensor angle by setting an offset based on the sensor correction value or a device that is configured to finely adjust angles of a transmitter and a receiver of the radar signal.

Another form of the present disclosure provides a method for a vehicle radar inspection inspecting an assembled state of a radar sensor mounted in a vehicle by a server installed on an inspection line, including connecting communication with a mobile terminal connected to the vehicle and aligning the vehicle to a reference inspection position of the radar sensor through a center portion installed on the inspection line; moving a terahertz wave scanner to a first scan position to photograph a first scan image and moving the scanner to a second scan position to photograph a second scan image; recognizing a three-dimensional coordinate of a stereoscopic image generated by matching the first scan image and the second scan image; and generating a sensor correction value based on an occurrence of assembly tolerance when the three-dimensional coordinate is not matched to a design plan of the vehicle and transmitting the sensor correction value to the radar sensor through the mobile terminal.

Aligning the vehicle to the reference inspection position may include: identifying a type of the vehicle that matches identification information of the mobile terminal; and aligning the vehicle to the reference inspection position corresponding to the type of the vehicle.

Moving the terahertz wave scanner to the first scan position to photograph the first scan image and moving the scanner to the second scan position to photograph the second scan image may include, moving, with a robot, the scanner to the first scan position and the second scan position, wherein the robot is configured to control a position of a different type of the vehicles and each of different type of vehicles has a different mounted position of the radar sensor.

Recognizing the three-dimensional coordinate of the stereoscopic image may include extracting at least three feature points on the stereoscopic image.

Generating the sensor correction value based on the occurrence of the assembly tolerance may include determining that a correction of the assembly tolerance is completed when the mobile terminal receives a sensor angle value of the radar sensor after transmitting the sensor correction value.

The method may further include receiving information of a correction target based on a radar signal of the radar sensor through the mobile terminal; comparing the information of the correction target with reference information and generating a sensor correction value when an error occurs in a sensor angle; and transmitting the sensor correction value to the radar sensor.

The method may further include, when the radar sensor transmits the sensor angle value, determining that the error correction is completed.

In some forms of the present disclosure, the recognition error of the radar sensor may be improved by accurately correcting the angle of the sensor that detects the assembly tolerance through the matching of the images of the radar sensor photographed at the plurality of scan positions by the terahertz wave scanner, and any cost associated with customer claims due to the recognition error may be saved.

Further, with the precision of the radar sensor correcting the assembly tolerance of the radar sensor and correcting the angle of the radar signal utilizing the correction target, the performance of ADAS may be improved.

Further, a non-mounting and a mis-mounting of the component in the vehicle may be detected through the terahertz scanner, thereby reducing a workload of the worker of the inspection line.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Throughout the specification, unless explicitly described to the contrary, the word "comprise" and variations such as "comprises" or "comprising", will be understood to imply the inclusion of stated elements but not the exclusion of any other elements. In addition, the terms "-er", "-or" and "module" described in the specification mean units for processing at least one function and operation and can be implemented by hardware components or software components and combinations thereof.

Hereinafter, a system and method for a vehicle radar inspection in some forms of the present disclosure will be described in detail with reference to the accompanying drawings.

Figure 2:
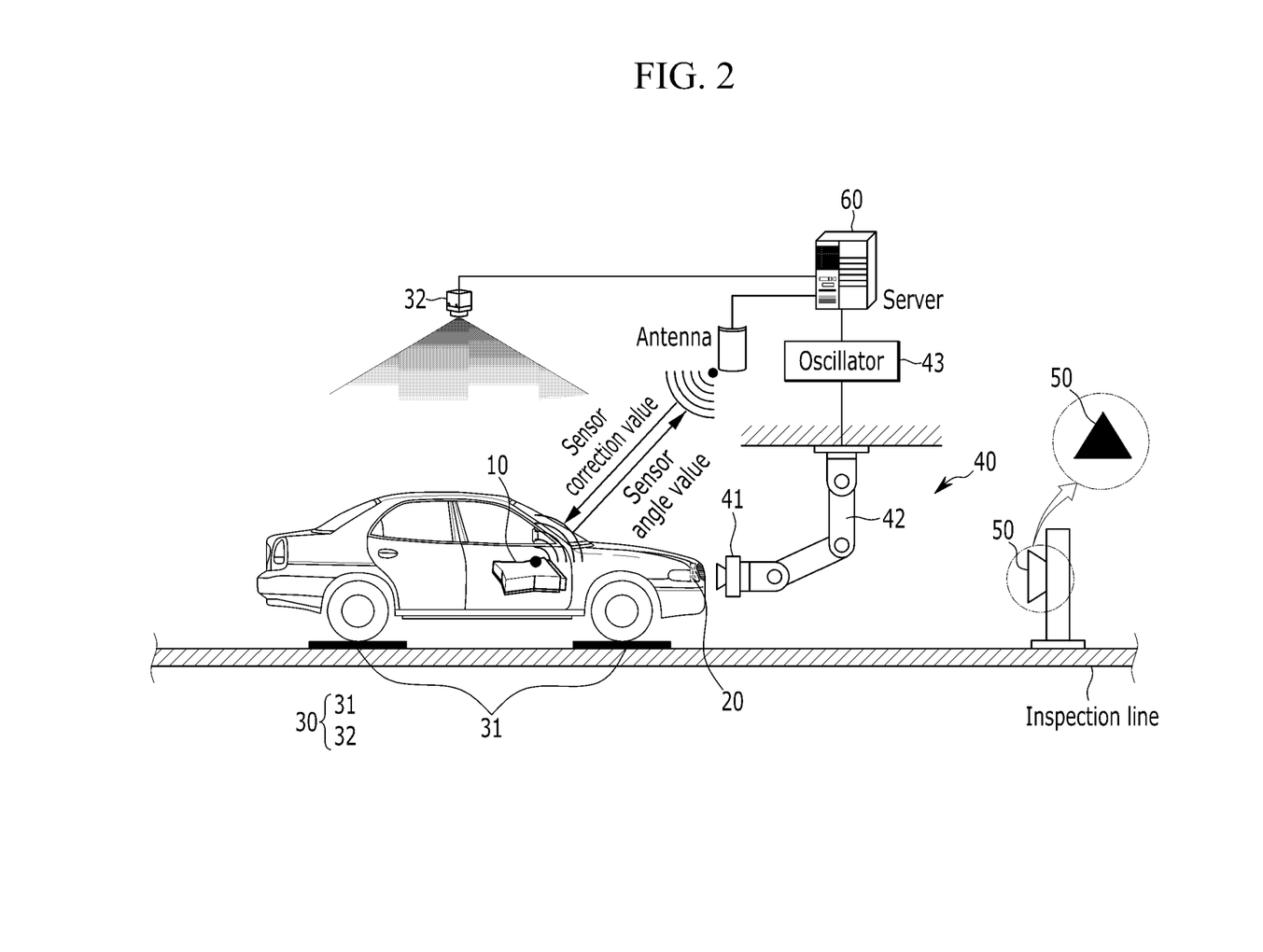
FIG. 2 schematically illustrates a configuration of a system for a vehicle radar inspection.

FIG. 2 schematically illustrates a configuration of a system for a vehicle radar inspection in some forms of the present disclosure.

Referring to FIG. 2, a system for a vehicle radar inspection in some forms of the present disclosure includes a mobile terminal 10 mounted in a vehicle, a radar sensor 20, and a center portion 30, a scan portion 40, a correction target 50, and a server 60 which are installed on an inspection line of the vehicle.

The mobile terminal 10 is each mounted in the vehicle moving along the inspection line and is matched with each unique identification (ID) and vehicle identification information.

The radar sensor 20 is mounted in a front bumper of the vehicle and is connected with a vehicle controller (not shown) through a communication line.

The mobile terminal 10 may be connected to the communication line within the vehicle through a connector to directly communicate with the radar sensor 20 or to communicate with the radar sensor 20 through the vehicle controller.

The mobile terminal 10 may include mobile on-board diagnostics (OBD), and serves to receive a sensor correction value from the server 60 through an antenna to transmit it to the radar sensor 20, and to transmit a sensor angle value of the radar sensor 20 to the server 20.

The radar sensor 20 includes a transmitter forwardly transmitting a radar signal, a receiver receiving reflected radar, and a control module (MCU) analyzing the reflected radar signal and measuring a distance, speed, and an angle with a front object.

The radar sensor 20 may set a sensor angle value at which the radar signal is transmitted through the control module, and may adjust a sensor angle according to the sensor correction value received from the server 60. For example, the sensor angle may be adjusted by a software method of setting an offset according to the sensor correction value. However, the forms of the present disclosure is not limited thereto, and the sensor angle may also be adjusted by a mechanical method through a mechanism that finely adjusts the angles of the transmitter and the receiver.

The center portion 30 aligns a position of the vehicle with a reference inspection position of the radar sensor 20 through the driving roller 31.

In this case, when tires of the vehicle are placed on the driving roller 31, the center portion 30 may detect the position of the vehicle through an upper vision sensor 32 and may move and align the vehicle to the reference inspection position by operating the driving roller.

The scan portion 40 photographs a position of the radar sensor 20 mounted in the vehicle using a terahertz wave and includes the scanner 41, the robot 42, and the oscillator 43.

The scanner 41 mounted on a tip of the robot 42 transmits a scan image of the radar sensor 20 photographed through the terahertz wave at a predetermined scan position to the server 60.

The robot 42 may be configured as a multi-joint manipulator capable of performing a kinematics attitude control and may move the scanner 41 to a plurality of scan positions which are set according to an applied control signal.

The oscillator 43 serves to generate the terahertz wave when the scan signal is input and to supply it to the scanner 41.

The scanner 41 may be moved to the plurality of scan positions which are set in advance by the robot 42 and may photograph a plurality of scan images.

Figure 3:
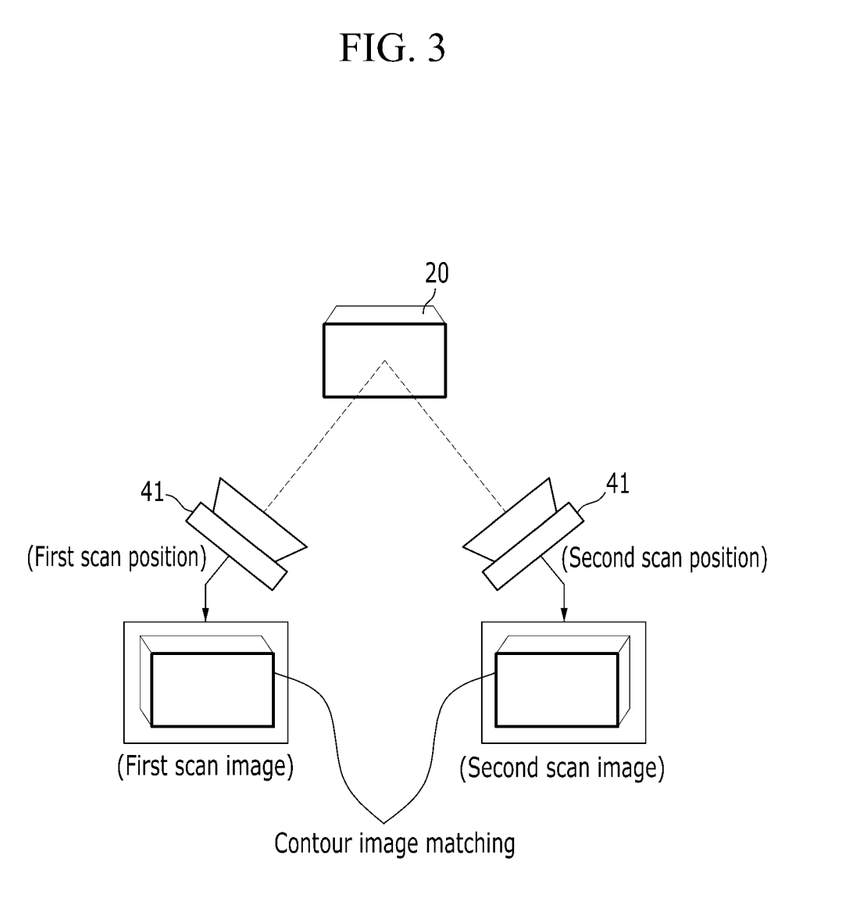
FIG. 3 schematically illustrates a method for photographing a stereo scan image.

For example, FIG. 3 schematically illustrates a method for photographing a stereo scan image in some forms of the present disclosure.

Referring to FIG. 3, the scanner 41 in some forms of the present disclosure moves to a first scan position on the left which is predetermined based on the mounted position of the radar sensor 20 to acquire a first scan image by a primary photographing.

Further, the scanner 41 moves to a second scan position on the right in a horizontal direction to acquire a second scan image by a secondary photographing.

The first scan image and the second scan image which are acquired as described above have an effect of acquiring an image photographed by two scanners according to the position movement of the robot 42 using one scanner 41, and may be generated as a stereoscopic image of the radar sensor 20 such as a stereo camera through a matching of two contour images in the server 60.

Here, the contour is a metal portion of the radar sensor 20 in which the terahertz wave does not penetrate, and may be, for example, a housing shape of the radar sensor 20.

The correction target 50, which is a structure disposed at the front of the centered vehicle, serves to reflect the radar signal transmitted from the radar sensor 20. The correction target 50 may be formed of an aluminum material having a polygonal shape such as a triangle.

The server 60 is a computer equipment controlling an overall operation of the respective units for inspection of the vehicle radar in some forms of the present disclosure.

The server 60 detects a three-dimensional position of the radar sensor 20 by matching the plurality of scan images photographed by the scan portion 40 and generates a sensor correction value corresponding to an occurrence of assembly tolerance with respect to a position value on a design plan of the vehicle and transmits the sensor correction value to the radar sensor 20 through the mobile terminal 10.

Figure 4:
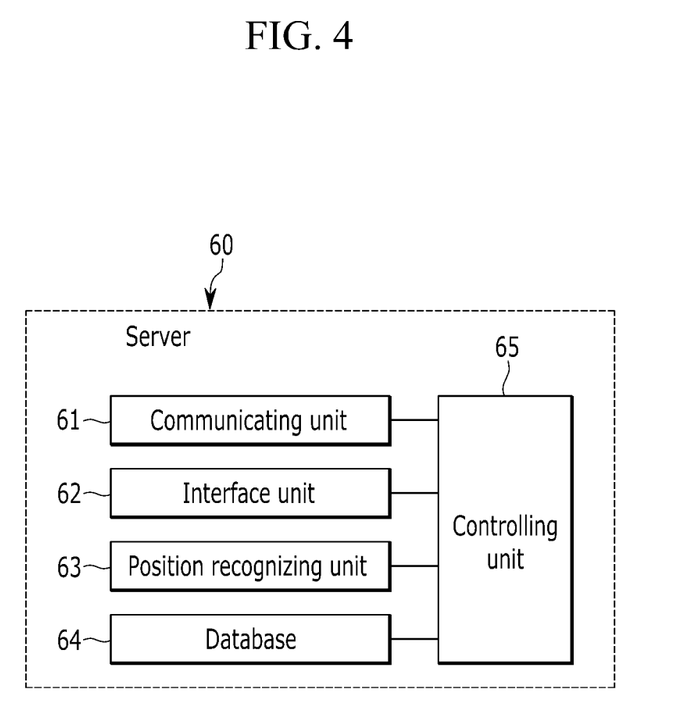
FIG. 4 is a block diagram schematically illustrating a configuration of a server.

FIG. 4 is a block diagram schematically illustrating a configuration of a server in some forms of the present disclosure.

Referring to FIG. 4, the server 60 in some forms of the present disclosure includes a communicating unit 61, an interface unit 62, a position recognizing unit 63, a database 64, and a control unit 65.

The communicating unit 61 receives the sensor angle value of the radar sensor 20 via an antenna and transmits the sensor correction value for adjusting the angle of the radar sensor 20 to the radar sensor 20.

The interface unit 62 connects communication with the center portion 30 and supports the server 60 to detect the position of the vehicle through the vision sensor 32 and to control the center of the vehicle by operating the driving roller 31.

Further, the interface unit 62 connects communication with the scan portion 40, and controls the photographing according to the scan position movement of the scanner 41 and receives the scan image photographed by the scanner 41.

The position recognizing unit 63 generates a three-dimensional stereoscopic image by matching the first scan image and the second scan image received from the scan portion 40, and recognizes a three-dimensional coordinate on the stereoscopic image.

Figure 5:
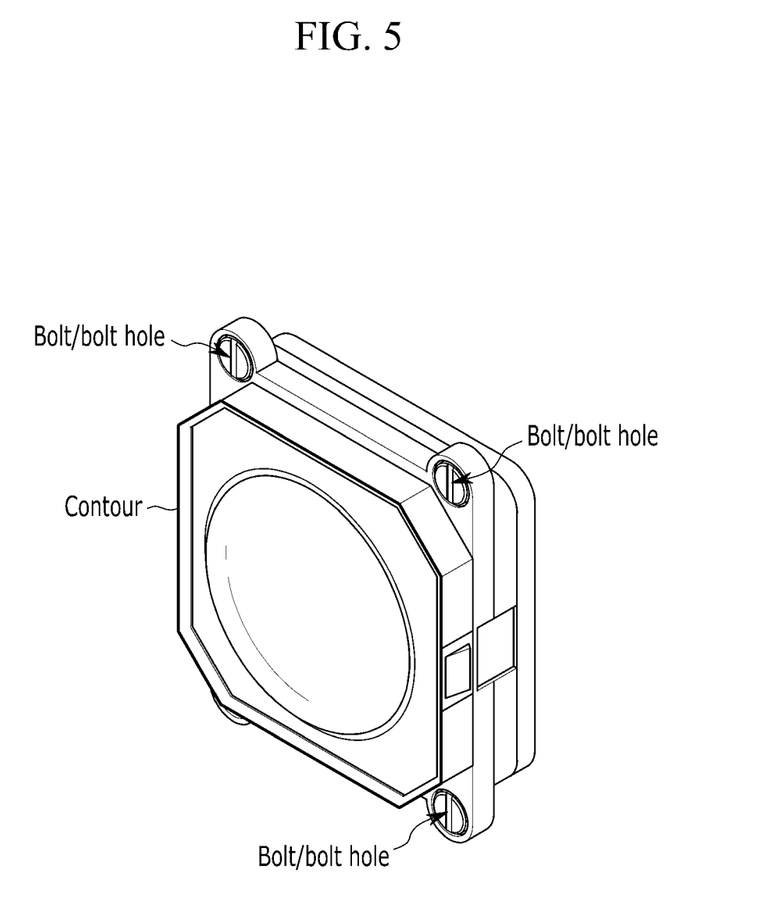
FIG. 5 illustrates a three-dimensional coordinate recognized portion of a radar sensor.

FIG. 5 illustrates a three-dimensional coordinate recognized portion of a radar sensor in some forms of the present disclosure.

Referring to FIG. 5, the position recognizing unit 63 in some forms of the present disclosure may recognize the three-dimensional coordinate on the stereoscopic image by extracting at least three points from a contour of a housing image formed of a metal through which the terahertz wave does not penetrate in the radar sensor 20.

Further, the position recognizing unit 63 is not limited to the housing image, but may recognize the three-dimensional coordinate by extracting three feature points on the stereoscopic image such as a bolt, a bolt hole, and the like.

The database 64 stores a variety of data and programs for inspection of the radar sensor 20 and stores data generated by the inspection of the radar sensor 20 for each of the vehicles.

For example, the database 64 may store a mounted position of the radar sensor on a design plan for each of different vehicles and may store centering information, first and second scan position information, and the like for each of different vehicles. Further, the database 64 may match identification (ID) of the mobile terminal 10 and vehicle identification information and store it, and may store a result according to the radar sensor inspection for the vehicle in which the mobile terminal 10 is mounted.

The control unit 65 is a central processing unit controlling an overall operation of the respective units for radar sensor inspection of the vehicle in some forms of the present disclosure.

The control unit 65 communicates with the mobile terminal 10 of the vehicle entering the inspection line to confirm the kind of the vehicle, and controls the center portion 30 according to the kind of the vehicle to align the vehicle with the reference inspection position of the radar sensor.

The control unit 65 photographs the first scan image at the first scan position and the scan image at the second scan position through the scan portion 40.

In this case, the control unit 65 controls attitude of the robot 42 for positioning the scanner 41 at the first scan position and the second scan position corresponding to the mounted position of the radar sensor 20. The control unit 65 may control the movement of the scanner 41 to the first and second scan positions which are different for the kind of the recognized vehicle by utilizing attitude information for the different vehicles having different mounted positions of the radar sensor 20.

The control unit 65 compares the three-dimensional coordinate recognized by the position recognizing unit 63 by matching the first scan image and the second scan image with the design plan of the vehicle to determine whether or not assembly tolerance of the radar sensor 20 occurs. Here, when the assembly tolerance such as displacement of the angle of the radar sensor 20, or the like, occurs, recognition error may occur in which the radar signal recognizes a corner portion of the radar cover.

Therefore, the control unit 65 generates the sensor correction value for correcting the assembly tolerance to transmit it to the radar sensor 20 through the mobile terminal 10, and receives a corrected sensor angle value from the radar sensor 20.

Hereinafter, a series of processes of measuring the scan image and correcting the assembly tolerance is referred to as a 'radar sensor primary inspection'.

Meanwhile, the control unit 65 may perform a 'radar sensor secondary inspection' of correcting the angle of the radar through the correction target 50 after the radar sensor primary correction.

The control unit 65 transmits the radar signal to the correction target 50 by operating the radar sensor 20 through the mobile terminal 10, and receives sensed information of the radar signal reflected by the correction target 50. The sensed information an angle and a distance between the radar sensor 20 and the correction target 50.

The control unit 65 compares the measured sensed information with inspection reference information, and generates the sensor correction value for correcting the angle of the radar signal when the sensed information exceeds an allowed range, to transmit it to the radar sensor 20 through the mobile terminal 10. In addition, the control unit 65 may receive the sensor angle value corrected by the radar sensor 20 from the mobile terminal 10 and may confirm a correction completion.

Meanwhile, a method for a vehicle radar inspection in some forms of the present disclosure will be described with reference to FIG. 6 based on the configuration of the system for a vehicle radar inspection described above.

However, since the components of the server 60 described above may be integrated or further subdivided, hereinafter, in describing the method for vehicle radar in some forms of the present disclosure, the subject of each of operations will be described as the server 60, not the corresponding components.

Figure 6:
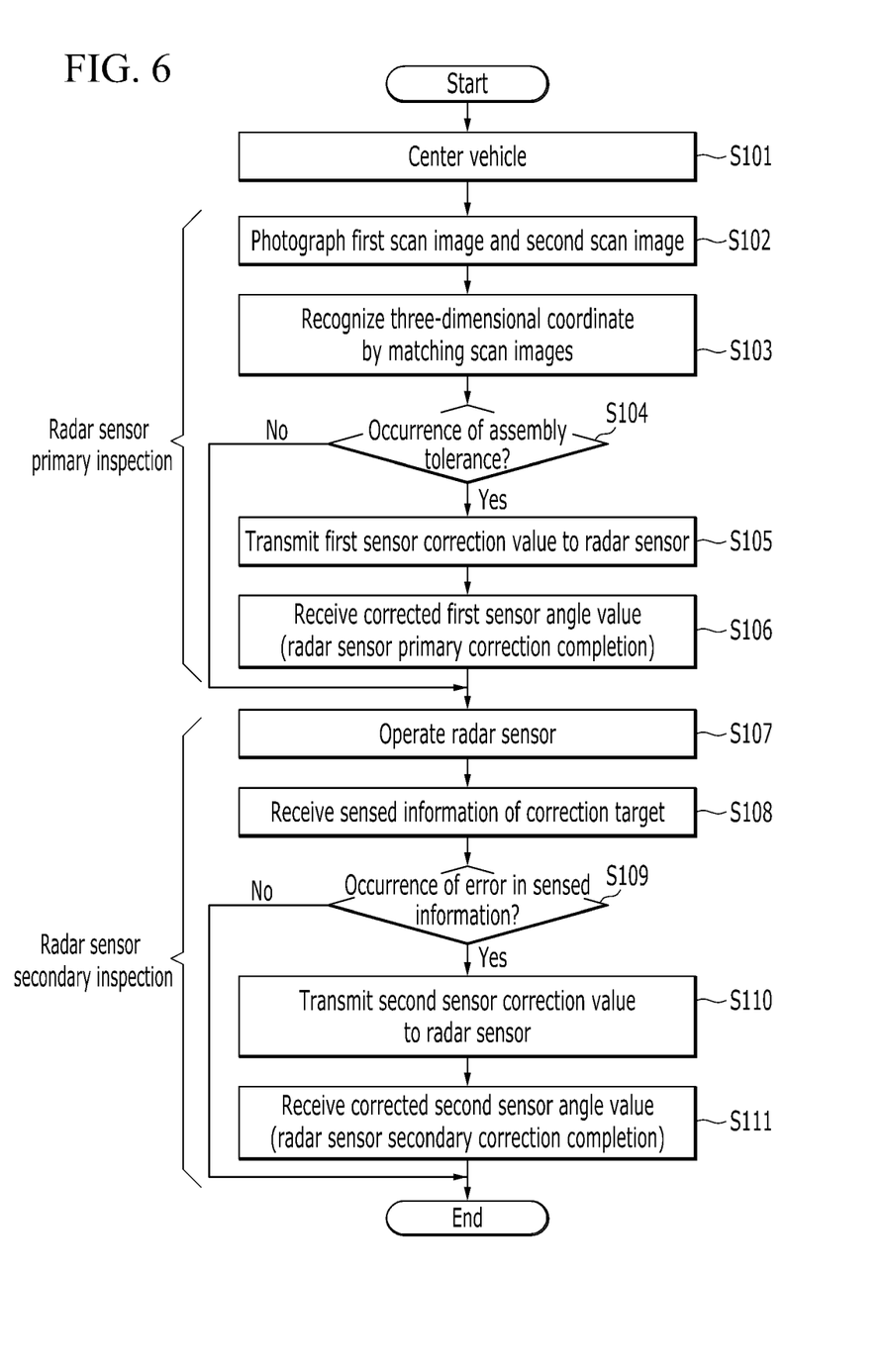
FIG. 6 is a flowchart schematically illustrating a method for a vehicle radar inspection.

FIG. 6 is a flowchart schematically illustrating a method for a vehicle radar inspection in some forms of the present disclosure.

Referring to FIG. 6, the server 60 in some forms of the present disclosure communicates with the mobile terminal 10 of the vehicle entering the inspection line and aligns the vehicle to the reference inspection position of the radar sensor through the center portion 30 (S101). In this case, the server 60 may confirm the kind of the vehicle matched to identification information of the mobile terminal 10 and may align the vehicle to a center position corresponding to the kind of the vehicle.

The server 60 moves the scanner 41 to the first scan position through the attitude control of the robot 42 to photograph the first scan image, and moves the scanner 41 to the second scan position to photograph the second scan image (S102).

The server 60 generates the stereoscopic image by matching the first scan image and the second scan image, and recognizes the three-dimensional coordinate on the stereoscopic image (S103). In this case, the server 60 may recognize the three-dimensional coordinate by extracting at least three feature points on the stereoscopic image.

The server 60 compares the three-dimensional coordinate with the design plan of the vehicle and determines that the assembly tolerance occurs when the three-dimensional coordinate and the design plan are not matched (No in S104), and generates the sensor correction value for correcting the assembly tolerance to transmit it to the radar sensor 20 through the mobile terminal 10 (S105).

Next, the server 60 may receive the sensor angle value corrected by the radar sensor 20 through the mobile terminal 10 and may confirm that the radar sensor primary correction is completed (S106).

Meanwhile, the server 60 operates the radar sensor 20 through the mobile terminal 10 (S107) and receives sensed information of the correction target 50 according to an occurrence of the radar signal (S08).

The server 60 compares the received sensed information with reference information, and when error occurs in the received sensed information (Yes in S109), the server 60 generates the sensor correction value for correcting the error to transmit it to the radar sensor 20 through the mobile terminal 10 (S110).

In addition, the server 60 may receive the corrected sensor angle value from the radar sensor 20 and may confirm that the radar sensor secondary correction is completed (S111).

Next, the server 60 terminates the radar inspection of the corresponding vehicle by releasing the center of the vehicle in which the inspection of the radar sensor is completed and taking out the vehicle.

Meanwhile, in the operation (S104), when the assembly tolerance of the radar sensor 20 does not occur (No in S104), the server 60 omits the radar sensor primary correction process and may perform the operation (S107).

Similarly, in the operation (S109), when the error does not occur in the sensed information of the radar sensor 20 (No in S109), the server 60 omits the radar sensor secondary correction process and may terminate the radar inspection of the corresponding vehicle.

As described above, in some forms of the present disclosure, the recognition error of the radar sensor may be solved by correcting the sensor angle by detecting the assembly tolerance through the matching of the images of the radar sensor photographed at the plurality of scan positions by the terahertz wave scanner, and a claim cost due to the recognition error may be saved.

Further, by improving the precision of the radar sensor by correcting the assembly tolerance of the radar sensor and correcting the angle of the radar signal utilizing the target, the performance of ADAS based on the improved precision of the radar sensor may be improved.

Hereinabove, some forms of the present disclosure have described, but the present disclosure is not limited thereto and may be variously modified.

Some forms of the present disclosure described above mainly describes that the assembly tolerance of the radar sensor 20 is detected by using the terahertz wave scanner 41, but the present disclosure is not limited thereto and the a non-mounting and a mis-mounting of a variety of components mounted in the vehicle may be detected by using the terahertz wave scanner 41.

For example, whether or not a camera, an ultrasonic sensor, a TPMS sensor, and a wheel speed sensor is mounted on the assembly line of the vehicle may be detected by moving the terahertz wave scanner mounted on the robot to the inspection position of each component and photographing the scan images.

Therefore, the non-mounting and the mis-mounting of the component may be detected through the terahertz scanner, thereby reducing a workload of the worker of the inspection line.

The description of the disclosure is merely exemplary in nature and, thus, variations that do not depart from the substance of the disclosure are intended to be within the scope of the disclosure. Such variations are not to be regarded as a departure from the spirit and scope of the disclosure.

DESCRIPTION OF SYMBOLS

10: mobile terminal
20: radar sensor
30: center portion
31: driving roller
32: vision sensor
40: scan portion
41: scanner
42: robot
43: oscillator
50: correction target
60: server
61: communicating unit
62: interface unit
63: position recognizing unit
64: database
65: control unit

What is claimed is:

1. A method for inspecting an assembled state of a radar sensor mounted in a vehicle by a server installed on an inspection line, the method comprising:
    connecting communication with a mobile terminal that is connected to the vehicle;
    aligning, with a center portion, the vehicle to a reference inspection position, wherein the center portion is installed on the inspection line;
    moving a terahertz wave scanner to a first scan position to photograph a first scan image and moving the scanner to a second scan position to photograph a second scan image;
    recognizing a three-dimensional coordinate of a stereoscopic image that is generated by matching the first scan image and the second scan image;
    generating a sensor correction value based on an occurrence of assembly tolerance corresponding to the three-dimensional coordinate of the stereoscopic image not matching a design plan of the vehicle; and
    transmitting, with the mobile terminal, the sensor correction value to the radar sensor,
    wherein moving the terahertz wave scanner to the first scan position to photograph the first scan image and moving the scanner to the second scan position to photograph the second scan image comprises:
    moving, with a robot, the scanner to the first scan position and the second scan position, wherein the robot is configured to control a position of a different type of the vehicles and each of the different type of the vehicles has a different mounted position of the radar sensor.

2. The method of claim 1, wherein aligning the vehicle to the reference inspection position comprises:
    identifying a type of the vehicle that matches identification information of the mobile terminal; and
    aligning the vehicle to the reference inspection position corresponding to the type of the vehicle.

3. The method of claim 1, wherein recognizing the three-dimensional coordinate of the stereoscopic image comprises:
    extracting at least three feature points on the stereoscopic image.

4. The method of claim 1, wherein generating the sensor correction value based on the occurrence of assembly tolerance further comprises:
    determining that a correction of the assembly tolerance is completed corresponding to the mobile terminal receiving a sensor angle value of the radar sensor after transmitting the sensor correction value.

5. The method of claim 1, wherein the method further comprises:
    receiving information of a correction target based on a radar signal of the radar sensor through the mobile terminal;
    comparing the information of the correction target with reference information;
    generating a sensor correction value corresponding to an error occurring in a sensor angle; and
    transmitting the sensor correction value to the radar sensor.

6. The method of claim 5, wherein the method further comprises:
    corresponding to the radar sensor transmitting the sensor angle value, determining that the error correction is completed.

* * * * *